Aug. 15, 1967     J. MURPHY     3,335,667
WAVE MACHINE AND MEANS FOR RAISING WATER
Filed Oct. 21, 1965
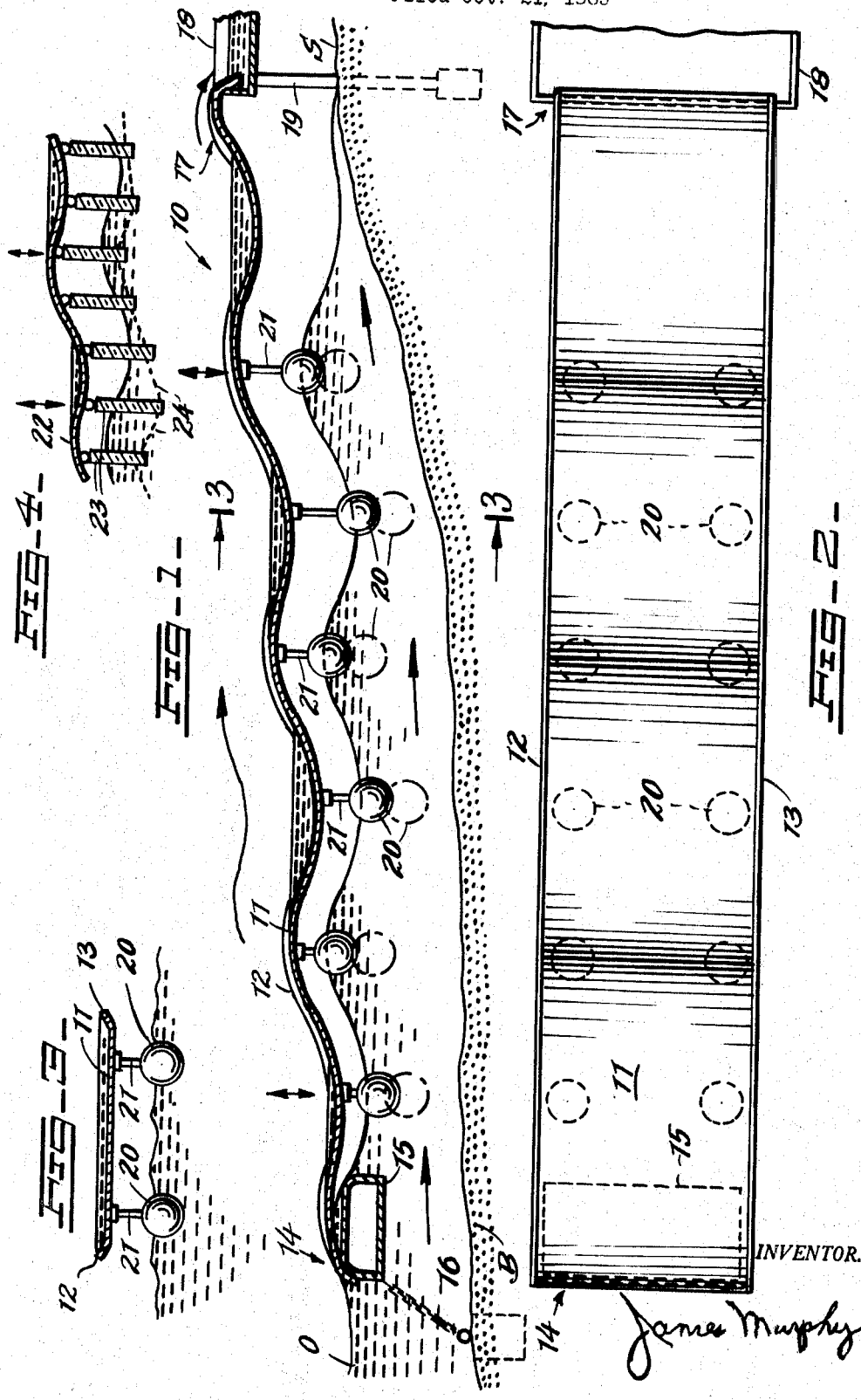
INVENTOR.
James Murphy

United States Patent Office 3,335,667
Patented Aug. 15, 1967

3,335,667
WAVE MACHINE AND MEANS FOR RAISING WATER
James Murphy, 50 E. 69th St., New York, N.Y. 10021
Filed Oct. 21, 1965, Ser. No. 499,642
4 Claims. (Cl. 103—68)

The present invention relates to machines for raising the natural level of sea water, and more particularly it relates to an ocean wave machine for the purpose of producing energy. The object of the present invention is to utilize the now wasted knietic energy of a moving ocean wave breaking on the sea shore, to raise great quantities of sea water up an inclined ramp or a trough and to deposit it in a tank high upon the shore. By this means the sea water having reached a higher level than the surface of the sea, the water from the tank may be let to pass through a conventional water turbine to generate large quantities of electric current in a generator.

The present invention will endeavor to provide a highly efficient means for the production of energy directly from the water waves as they rise and sink. Especially the present invention will provide a means for raising sea water from a lower level to a higher level.

Mainly the present invention provides for the utilization of an inclined ramp, preferably made of flexible resilient material such as reinforced rubber or plastic. The ramp may be several hundred feet long and of substantial width (ten to forty feet) and may be provided on either margin thereof with a vertical (or inclined) flange so that it forms an elongated trough open at either end and flanged along the long margins. One open end of the trough ends high upon the beach mounted upon platforms or a concrete ramp (15 to 30 feet high) while the other open end may be stretched over the beach and into the ocean, extending the entire length over the surf and into the incoming waves.

Under the long trough there may be secured a plurality of air-evacuated tanks (spherical, cylindrical or rectangular in shape). These are properly secured and made fast to the under side of the trough by means of sturdy uprights. The tanks float over the surface of the ocean, and so are raised and lowered as a wave passes under them. In as much as the wave movement has a rhythm, it is obvious that it will transfer this rhythmic motion to the floating tanks which will be raised and lowered in a rhythmic fashion simulating the shape of the wave as the wave passes under the trough. The trough being secured to the tanks (by means of the uprights) these will also rise and fall following the movement of the tanks floating over the waves.

Because one free (open) end of the long trough is anchored and immersed into the sea (permitting the waves to cover it with sea water) the rhythmic motion of the trough will first form a concave or a shallow hollow space which by its very nature will be filled with sea water. As the wave crest continues to advance and to run under the trough, it will raise the tanks under it and form a raised or a convex section. Further motion of the wave under the trough will bend and deform the latter conversely with the shape of the wave so that the trough will form consecutive concave and convex evolutions, in which water will first collect and then be impelled, from one section of the trough into the other advancing towards the shore. This action will repeat every time a wave crest passes under the trough, and in such a fashion as to produce a continuous stream of water raised from the surface of the ocean and moved into a tank on the shore. From the tank the water may be piped to water turbines to turn generators.

It is understood that a wave machine of the nature here described (consisting of a long trough anchored in the ocean at one end and at the other on the shore) is subject to the caprices of the sea and the inclement weather. It must be secured carefully to prevent it from being blown away by high winds and hurricanes, and to prevent damage to the dwellings on shore. Particularly the open end of the trough (which enters the ocean) must be carefully anchored to the bottom by means of sturdy chains and concrete anchor blocks. Even chains or cables among the individual tanks may be necessary to prevent the trough being torn away by high winds. For efficient operation, of course, the wave machine should be made operational at all times, in good and inclement weather. But in the event the weather becomes too severe and may do harm to the machine, in that event the tanks supporting it may be flooded to permit the trough to sink to the bottom. With the worst of the storm being over, the water may be forced out of the tanks and the trough may be raised to the surface ready for immediate operation, substantially as above described.

Accordingly, one object of the present invention is o provide a wave machine of the class described which may be easily erectable on the beach, safe in its operation and effective.

Another object of the present invention is to provide a wave machine which may be formed of a substantially elongated resilient trough mounted to tanks and anchored to float over the waves on the beach.

An additional object of the present invention is to provide a wave machine which will raise substantial quantities of sea water to tanks from which the water may be delivered to conventional type water turbines to turn generators.

A further object of the present invention is to provide means for lowering the wave machine under water to prevent damage to the machine in inclement weather.

This invention also consists in certain other features of construction, and the combination and arrangement of parts, to be hereinafter fully described, illustrated in the accompanying drawing, and especially pointed out in the appended claims.

In describing the invention in detail, references will be made to the accompanying drawing where like character numerals denote like or corresponding parts throughout the several views, in which:

FIG. 1 is a cross-sectional view showing the embodiment of the present invention in detail;

FIG. 2 is a top elevational view of FIG. 1;

FIG. 3 is a sectional view taken on the line 3—3 of FIG. 1;

FIG. 4 is a detail of a modification.

It is to be understood that the present form of disclosure is merely for the purpose of illustration and that there might be devised various modifications thereof without departing from the spirit of the invention as herein set forth.

Referring now more particularly to the wave machine 10 forming the embodiment of the present invention, best seen in FIG. 1, comprising, in combination, the elongated flexible and resilient trough 11, preferably formed of reinforced rubber or plastic, and being provided upon either of its margins with the upright (or inclined) flanges 12 and 13, respectively (see FIGS. 2 and 3).

At one extreme end 14 thereof the trough 11 may be anchored by means of the rectangular float 15 and the chains 16 to the bottom B of the ocean O, at a considerable distance from the beach S. The opposite end 17 of the trough 11, by means of appropriate supports is moored to a water tank 18 which through the medium of the uprights 19 may be supported several feet above the surface of the beach.

Under the trough 11 there are housed a plurality of circular (cylindrical or rectangular) tanks 20 which by means of the uprights 21 may be secured to the underside of the trough 11, substantially as shown. The tanks 20 may be secured under the trough 11 in a single file, in a double file (see FIG. 2) or in multiple files of more than two depending upon the width of the trough 11.

It is clear that because the tanks 20 are substantially hollow, air-tight, they are light and will float over the surface of the ocean. When the sea is calm (which is seldom the case) the floats or the tanks 20 will simply float without imparting any action to the flexible trough they are supporting. But in the event that the sea is turbulent, then the waves running over the beach to the shore will raise and lower the trough 11 as they are advancing in a rhythmic fashion towards the beach. This rhythmic motion of the waves will impart its action to the trough 11 which will subsequently rise and fall with the waves forming consecutive concave and convex sections upon its entire length. By means of the involution thus created upon the flexible trough by the action of the waves, substantial amounts of sea water will be scooped up from the surface of the ocean at the point 14 and moved by means of the involutions of the trough 11 to the water-tank 18 on the shore. There the water will collect and may be utilized to turn water turbines to generate electricity.

FIG. 4 shows a modification. In this case the trough 22 is being supported upon rectangular columns or floats instead of the spherical tanks 22. The rectangular floats in question may be formed of blocks of foam plastic (which is lighter than water). To prevent the blocks 23 from being pulled apart due to the turbulence of the waves, chains are provided and secured from one column to the other under water, substantially as shown.

A careful examination of the foregoing description in conjunction with the invention as illustrated in the drawing, will enable the reader to obtain a clear understanding and impression of the alleged features of merit and novelty, sufficient to clarify the construction of the invention as hereinafter claimed.

Minor changes in shape, size and materials, and rearrangement of parts, may be readily resorted to in actual practice, as long as no departure is made from the invention claimed.

Having described my invention, what I claim is the following:

1. A wave machine of the class described, including, in combination, an elongated flexible and resilient trough of substantial length, and of a lesser width, flanges formed on either margins of the long trough, one end of said trough held to a float, said float being anchored in the ocean at a distance away from the beach, the other end of said trough being moored on the beach, at a higher level than the surface of the water in the ocean, floats under said trough, means for supporting said trough upon uprights formed from said floats, said floats floating freely upon the surface of the ocean over the waves and being implanted a rhythmic up-and-down motion by the waves as they rise and fall, concave and convex sections being formed upon said resilient trough as the waves advance under it, the motion of the waves being imparted to said trough to carry substantial amounts of water from the ocean up to the water tank upon the shore.

2. The combination according to claim 1; and upright columns provided under said trough, one end of the upright columns secured fast to the under side of said trough and the other end of said upright columns held to said floats.

3. The combination according to claim 1; and stabilizing chains provide to stabilize said tanks under said trough, said chains mounted to connect one tank to the other substantially as described.

4. The combination according to claim 1; said floats being formed from rectangularly-shaped blocks of foam plastic, said blocks mounted to the under side of said trough, and chain means to connect one block to the other for stabilizing purposes.

References Cited
UNITED STATES PATENTS

| | | | |
|---|---|---|---|
| 646,815 | 4/1900 | Emmers | 253—14 |
| 845,214 | 2/1907 | Bazin | 61—20 |
| 1,026,450 | 5/1912 | Neal | 253—14 |
| 3,048,141 | 8/1962 | Fisk | 115—28 X |

DAVID J. WILLIAMOWSKY, *Primary Examiner.*

P. M. CAUN, *Assistant Examiner.*